May 24, 1960
A. S. PATTEN
2,937,682
J-CLIP WITH NUT STAKED THERETO
Filed Aug. 28, 1956
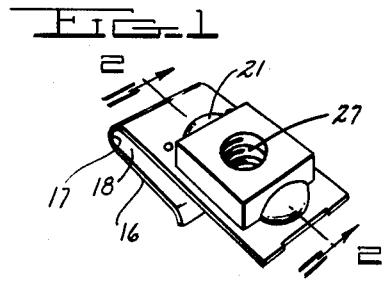
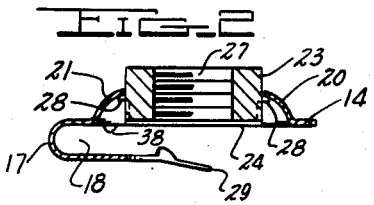
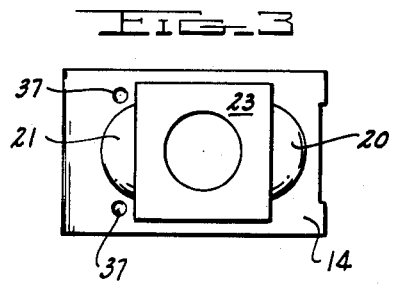
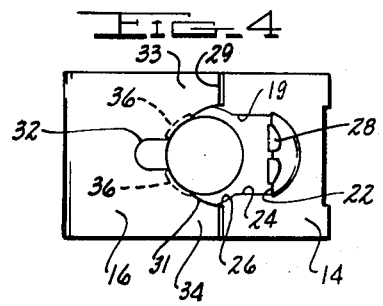
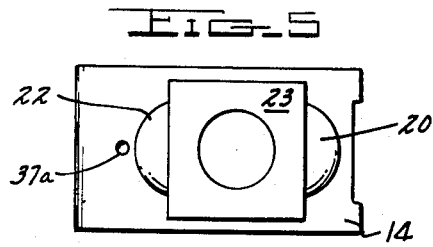
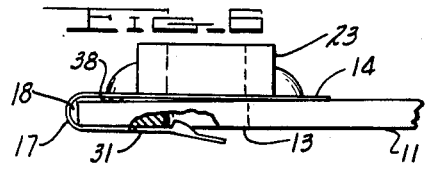
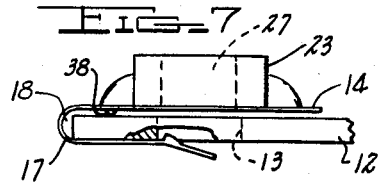
INVENTOR
ALEXANDER S. PATTEN
BY
KOTTS & SHERIDAN
ATTORNEYS

United States Patent Office

2,937,682
Patented May 24, 1960

2,937,682
J-CLIP WITH NUT STAKED THERETO

Alexander S. Patten, Detroit, Mich., assignor to Multifastener Corporation

Filed Aug. 28, 1956, Ser. No. 606,753

1 Claim. (Cl. 151—41.75)

The present invention relates to improvements in a fastener construction, and particularly such a construction which includes a clip having a nut affixed thereto.

In the clip fastener art it is common practice to provide clips of heavy material for the sturdiness required in holding the fastener in position on a panel. As a result, spring action of the clip arms is very limited, making it necessary to manufacture a variety of clip sizes for a variety of panel thicknesses.

It is also desirable to have a floating action of the fastening member or nut with respect to the panel after the clip is affixed to the panel so that the bolt which is eventually secured to the fastening member can be properly aligned therewith. If an improper sized clip is placed on a panel, proper floating action of the fastener does not take place. This causes misalignment with resultant jamming and cross-threading of the bolt in the fastener or nut.

In the present application, the invention is illustrated with a J type clip having substantially parallel arms and an upturned centering anchor in the lower arm for aiding in the centering and holding of the fastener in a bolt hole provided in the panel. In a preferred embodiment of the invention a pair of semi-spherical shaped nubs, are formed in the upper arm near the central connecting wall and extend downwardly into the throat area of the fastener. The cam-like surfaces of the semi-spherical shaped nubs permit easy entry of the clip onto a panel. When the device of the present invention is in use with a panel, the semi-spherical nubs are in frictional contact with the panel surface and provide a mechanical lock. This mechanical lock along with the natural spring action of the clip positively holds the fastener in position on a variety of panel thicknesses despite handling and jarring of the panels prior to and during assembly.

An object of the present invention is to provide a versatile fastener construction which is adapted for use on panels of varying thicknesses.

A further object is to provide a fastener construction having mechanical friction locking means together with normal spring holding means.

Another object is to provide a simple clip type fastener construction which permits a proper floating action when used with panels of varying thicknesses.

A further object is to provide a fastener construction which is simple and inexpensive to manufacture and which can be quickly and easily mounted on panels of varying thicknesses.

Other objects of this invention will appear in the following description and appended claim, reference being had to the accompanying drawings forming a part of this specification wherein like reference characters designate corresponding parts in the several views.

In the drawings:

Fig. 1 is a perspective view of a fastener construction using the present invention.

Fig. 2 is a longitudinal cross section taken along the line 2—2 in the direction of the arrows, Fig. 1.

Fig. 3 is a top plan view of the fastener shown in Fig. 1.

Fig. 4 is a bottom view of the fastener shown in Fig. 1.

Fig. 5 is a top plan view similar to Fig. 3, and illustrating a modification of the present invention.

Fig. 6 is a side elevational view of a fastener construction utilizing the present invention mounted onto a relatively thick panel, part of the panel being broken away for clarity.

Fig. 7 is a side elevational view similar to Fig. 6, but showing the fastener construction mounted onto a relatively thin panel.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, a weldless nut fastener using a J type clip is shown. The fastener may be used on panels of various thicknesses including a relatively thick panel 11 (Fig. 6) and a relatively thin panel 12 (Fig. 7), which panels are provided with a conventional bolt hole 13. The fastener construction consists of two superimposed integral arms 14 and 16 substantially parallel to each other and joined by a curved connecting wall 17 to form a throat area 18. The upper arm 14 is longer than the lower arm 16 and has a longitudinally disposed rectangular slot 19. At each end of the longitudinally disposed rectangular slot 19 are diametrically opposed, radial drawn cups 20 and 21 ending at their highermost points to form the straight short sides 22 of the rectangular slot 19 for positioning a commercially manufactured, internally threaded rectangular nut 23 therebetween. The long sides 24 of the slot 19 are spaced a distance less than the width of the nut 23 to form a supporting surface for the nut 23. After the nut 23 has been centered between the radial drawn cups 20 and 21 and seated over the opening 26, the nut 23 is secured in this position from the underside by a staking operation wherein displaced metal 28 is cut from the ends of the nut 23 and is physically conformed to underlie the underside of the radial drawn cups 20 and 21, thus securing the nut 23 in position.

The lower arm 16 has a downwardly extending leading edge 29, and a centrally disposed substantially circular recess 31 extending inwardly from the leading edge 29. This recess 31 is substantially axially aligned with the threaded aperture 27 in the nut 23. In the center of the recess 31 is another slot 32 extending rearwardly a short distance toward the connecting wall 17 to divide the lower arm 13 into two entrance fingers 33 and 34. Beginning at the point of juncture with the slot 32, a portion of the edge of the recess 31 is bent upwardly into the throat area 18 to form a ramp-like divided centering anchor 36 which aids in mounting, positioning and anchoring the fastener in place on the panel. As shown in the drawings, the centering anchor 36 seats itself within the panel hole 13 in a manner which permits access by the bolt (not shown) to the threaded aperture 27 of the nut 23.

In one form of the invention (Figs. 1–4, 6 and 7) a semi-spherical nub 37 is formed on each side of the rearmost radial drawn cup 21. The semi-spherical shaped nubs 37 extend downwardly into the throat area 18 and are formed with a rounded cam-like exterior 38 which permit easy entry of the panel into the throat area 18 of the fastener. The semi-spherical nubs are positioned from the rear edge of the nut on a center line approximately one diameter behind the edge of the nut and approximately the same distance in from each edge. The semi-spherical shaped nubs 37 provide an additional and independent mechanical lock upon the panel which successfully resists forces likely to partially or totally disengage the fastener from the panel. Although the semi-spherical nubs 37 and the centering anchor 36 cooperate to efficiently secure the fastener construction to the panel, this is accomplished in a manner which permits the nut 23 to float with respect to panel hole 13. Thus, when a bolt is inserted through panel hole 13, the nut 23 will align itself with the bolt and avoid cross threading and jamming.

Because the semi-spherical shaped nubs 37 project downwardly and the centering anchor 36 projects upwardly into the throat area 18 of the fastener, any panel which is greater in thickness than the distance between the topmost part of the centering anchor 36 and the lowermost part of the semi-spherical shaped nubs 37, and less than the effective width of the throat area of the fastener, can use the same fastener. As a result, one fastener can be used effectively for a wide variety of panels.

In Fig. 5 there is shown a modification of the device wherein a single semi-spherical shaped nub 37a is provided rearwardly of the central position of the radial drawn cup 21 and likewise extends downwardly into the throat area 18. This single semi-spherical shaped nub 37 may be used effectively in smaller size fasteners and/or where the stress on the fastener and panel prior and during assembly is not too great.

In Figs. 6 and 7 of the drawings there is shown a fastener of the present invention used with a relatively thick panel 11 and also with a relatively thin panel 12. This is accomplished without sacrificing good securing action, accessibility or floating of the fastener with respect to the panel.

It can be seen that it is possible to use a fastener of the present invention for a variety of panel thicknesses, eliminating the necessity of a variety of different size fasteners. A single fastener die replaces several fastener dies, and a single size fastener replaces fasteners of several sizes. Mass production means may be employed to fabricate a limited number of fastener sizes, and this greatly simplifies production, storage and packaging. The semi-spherical shaped nubs cooperate with the centering anchor to provide a mechanical friction lock which secures the panel from shearing forces which might otherwise disengage the fastener from the panel. Installation is simple and effective regardless of the panel thickness.

Since the clip portion is made of a resilient material such as spring steel, the arms of the clip provide a springing action which tends to hold the clip in position. This springing action aids the semi-spherical nub and anchor construction to provide an extremely efficient unit.

Having thus described my invention, I claim:

In a resilient floating type weldless fastener having a pair of parallel superimposed integral arms joined by a radially curved connecting wall and defining a throat area therebetween, the throat area being closed at one end and having an unrestricted entrance at the opposite end, the forward end of the upper arm projecting beyond the lower arm, and wherein the upper arm also has located thereon a pair of diametrically opposed radially drawn cups which form a nut retaining means and a longitudinal slot which is disposed between the cups, a standard internally threaded commercial nut is positioned over the longitudinal slot and is supported by two flat surfaces adjacent the standard nut, the standard nut being positioned between the cups and deformed from the bottom to engage the underside of the cups and retain the standard nut in position, the lower arm has a substantially semi-circular recess on the forward edge thereof which is aligned with the threaded portion of the commercial nut, said semi-circular recess having a centrally located elongated slot which is disposed rearwardly and the edges adjacent to the elongated slot each having an upwardly extending radial locating and positioning anchor, the radial positioning anchors are disposed forwardly in descending fashion to form a ramp section terminating short of the leading edge of the lower arm which is also turned downwardly to form a ramp section, thus permitting free floating action of the fastener when assembled on a panel member, the improvement consisting of a pair of semi-spherical downwardly deformed nubs transversely aligned on the upper arm and positioned rearwardly the rear face of the standard commercial threaded nut a distance from the edge of the nut to the center line of the semi-spherical nub equivalent to approximately one diameter of a nub, the transverse spacing being inwardly of the outer parallel edges of the standard commercial nut and spaced approximately a distance equivalent to a diameter of one semi-spherical nub to the center line of said nub, the faces of said semi-spherical nubs being located in the throat portion between the upper and lower arms to accommodate panel members of varying thickness and to provide a mechanical frictional locking advantage when assembled on a panel member due to the inter-relation of the forward edge of the upper arm, the semi-spherical nubs in the upper arm and the radial anchors located on the lower arm.

References Cited in the file of this patent

UNITED STATES PATENTS

| | | |
|---|---|---|
| 1,014,684 | Weygand | Jan. 16, 1912 |
| 1,872,385 | Andren | Aug. 16, 1932 |
| 2,101,287 | Tinnerman | Dec. 7, 1937 |
| 2,255,469 | Kost | Sept. 9, 1941 |
| 2,274,014 | Tinnerman | Feb. 24, 1942 |
| 2,278,790 | Langmaid | Apr. 17, 1942 |
| 2,631,634 | Tinnerman | Mar. 17, 1953 |
| 2,760,540 | Poupitch | Aug. 28, 1956 |
| 2,777,496 | Khan | Jan. 15, 1957 |